US008696192B2

(12) United States Patent
Sprague

(10) Patent No.: US 8,696,192 B2
(45) Date of Patent: Apr. 15, 2014

(54) MULTIPLE HELICAL VORTEX BAFFLE

(75) Inventor: Allison Sprague, Prescott (CA)

(73) Assignee: Fluid-Quip, Inc., Springfield, OH (US)

(*) Notice: Subject to any disclaimer, the term of this patent is extended or adjusted under 35 U.S.C. 154(b) by 653 days.

(21) Appl. No.: 11/746,948

(22) Filed: May 10, 2007

(65) Prior Publication Data
US 2008/0277009 A1 Nov. 13, 2008

(51) Int. Cl.
B01F 13/00 (2006.01)
B01F 5/00 (2006.01)
C02F 1/32 (2006.01)
B01J 19/12 (2006.01)

(52) U.S. Cl.
USPC ........ 366/144; 366/336; 366/338; 165/109.1; 165/DIG. 409; 165/DIG. 415; 250/436; 250/437

(58) Field of Classification Search
USPC ......... 138/38, 42, 44, 40; 165/DIG. 409, 415, 165/421, 445, 503, 504, 109.1; 366/337, 366/338, 340, 336; 250/435–438
See application file for complete search history.

(56) References Cited

U.S. PATENT DOCUMENTS

| 395,638 | A | * | 1/1889 | Stuart | 172/153 |
| 934,572 | A | * | 9/1909 | Reis | 138/38 |
| 1,398,063 | A | * | 11/1921 | Brown | 48/189.4 |
| 1,553,093 | A | * | 9/1925 | Modine | 165/151 |
| 1,561,044 | A | * | 11/1925 | Alexander | 261/113 |
| 1,612,930 | A | * | 1/1927 | Lochen | 138/38 |
| 1,689,446 | A | * | 10/1928 | Miller et al. | 48/189.4 |
| 1,713,020 | A | * | 5/1929 | Bowne | 138/38 |
| 1,927,325 | A | * | 9/1933 | Ritter | 165/151 |
| 1,940,804 | A | * | 12/1933 | Karmaxin | 165/151 |
| 1,971,842 | A | * | 8/1934 | Young | 165/151 |
| 2,085,132 | A | * | 6/1937 | Underwood | 366/340 |
| 2,091,593 | A | * | 8/1937 | Herz | 165/151 |

(Continued)

FOREIGN PATENT DOCUMENTS

DE 36 18 062 12/1987
DE 3618062 A1 12/1987

(Continued)

OTHER PUBLICATIONS

Axel Brunold; International Search Report and Written Opinion; Jul. 8, 2008; 11 pages; European Patent Office.

(Continued)

Primary Examiner — Tony G Soohoo
(74) Attorney, Agent, or Firm — Wood, Herron & Evans, LLP

(57) ABSTRACT

A baffle includes a body member having a first surface, a second opposed surface, and an outer peripheral edge. An aperture may be formed through the body member so as to define an inner peripheral edge. The inner peripheral edge is distorted so as to be non-planar. An apparatus includes a first conduit having a first end, a second end, and a first channel extending therebetween. At least one baffle is disposed in the first channel and includes a body member having a first surface, a second opposed surface, and an outer peripheral edge. At least one aperture may be formed through the body member to define an inner peripheral edge. The inner peripheral edge is distorted so as to be non-planar. A second conduit may be disposed inside the first conduit and extend through the aperture in the baffle. The apparatus may, for example, be configured as an ultraviolet light reactor, a heat exchanger, or a static mixer.

17 Claims, 6 Drawing Sheets

(56) References Cited

U.S. PATENT DOCUMENTS

| | | | | |
|---|---|---|---|---|
| 2,206,440 | A * | 7/1940 | Henry | 261/112.1 |
| 2,321,719 | A * | 6/1943 | West | 48/189.4 |
| 2,575,321 | A * | 11/1951 | Traver | 172/555 |
| 2,615,766 | A * | 10/1952 | De Loss | 384/420 |
| 2,667,337 | A * | 1/1954 | Chapman | 165/184 |
| 2,670,011 | A * | 2/1954 | Bertin et al. | 138/44 |
| 2,779,383 | A * | 1/1957 | Johnson | 29/727 |
| 2,873,098 | A * | 2/1959 | Morgan | 165/159 |
| 2,908,338 | A * | 10/1959 | Hanrahan | 172/555 |
| 3,061,721 | A * | 10/1962 | Brenner | 250/431 |
| 3,143,401 | A * | 8/1964 | Jurgen | 48/180.1 |
| 3,212,521 | A * | 10/1965 | Jean | 137/494 |
| 3,217,533 | A * | 11/1965 | Able | 73/862.08 |
| 3,266,780 | A * | 8/1966 | Waters | 366/152.1 |
| 3,297,305 | A | 1/1967 | Walden | |
| 3,300,971 | A * | 1/1967 | Qualman et al. | 60/341 |
| 3,361,412 | A * | 1/1968 | Cole, III | 366/268 |
| 3,400,758 | A | 9/1968 | Lee | |
| 3,417,975 | A * | 12/1968 | Williams et al. | 261/114.3 |
| 3,439,737 | A * | 4/1969 | Betts et al. | 165/109.1 |
| 3,450,199 | A * | 6/1969 | Warrell | 165/159 |
| 3,462,597 | A * | 8/1969 | Young | 250/431 |
| 3,515,207 | A * | 6/1970 | Lu | 165/151 |
| 3,519,070 | A * | 7/1970 | Bappler | 165/184 |
| 3,526,391 | A * | 9/1970 | Church, Jr. | 366/340 |
| 3,527,940 | A * | 9/1970 | Bernard et al. | 250/434 |
| 3,559,748 | A * | 2/1971 | Shelton | 172/604 |
| 3,618,910 | A * | 11/1971 | Arndt | 261/94 |
| 3,623,577 | A * | 11/1971 | Scharlack | 188/71.6 |
| 3,633,663 | A * | 1/1972 | Tafel | 165/89 |
| 3,645,330 | A * | 2/1972 | Albright et al. | 165/151 |
| 3,657,087 | A * | 4/1972 | Scott | 423/242.1 |
| 3,743,250 | A * | 7/1973 | Fitzhugh et al. | 366/337 |
| 3,746,216 | A * | 7/1973 | Frederick | 222/137 |
| 3,752,453 | A * | 8/1973 | Doyne | 261/94 |
| 3,775,234 | A * | 11/1973 | Rich | 428/183 |
| 3,782,694 | A * | 1/1974 | Shano | 366/340 |
| 4,008,045 | A * | 2/1977 | Free | 250/436 |
| 4,032,114 | A * | 6/1977 | Kolm et al. | 366/165.2 |
| 4,085,491 | A * | 4/1978 | Mathwig | 29/890.033 |
| 4,120,350 | A * | 10/1978 | Norton | 165/162 |
| 4,172,019 | A * | 10/1979 | Woodbridge | 422/22 |
| 4,208,136 | A * | 6/1980 | King | 366/338 |
| 4,215,454 | A * | 8/1980 | Anthony | 29/890.046 |
| 4,258,782 | A * | 3/1981 | Kao | 165/109.1 |
| 4,259,021 | A | 3/1981 | Goudy, Jr. | |
| 4,327,671 | A * | 5/1982 | Zimmer, Sr. | 122/44.2 |
| 4,423,703 | A * | 1/1984 | Esselman et al. | 122/510 |
| 4,434,846 | A * | 3/1984 | Lu | 165/161 |
| 4,467,206 | A * | 8/1984 | Taylor et al. | 250/435 |
| 4,592,390 | A * | 6/1986 | Boyd | 138/45 |
| 4,597,916 | A * | 7/1986 | Chen | 261/94 |
| 4,604,247 | A * | 8/1986 | Chen et al. | 261/94 |
| 4,637,457 | A * | 1/1987 | Wepfer | 165/162 |
| 4,710,326 | A * | 12/1987 | Seah | 261/112.2 |
| 4,726,695 | A * | 2/1988 | Showalter | 384/121 |
| 4,729,665 | A | 3/1988 | Goudy, Jr. | |
| 4,740,334 | A * | 4/1988 | Rukovena, Jr. | 261/112.2 |
| 4,753,833 | A * | 6/1988 | Fishgal et al. | 428/34.1 |
| 4,815,531 | A * | 3/1989 | Presz et al. | 165/151 |
| 4,834,173 | A * | 5/1989 | Weiss et al. | 165/159 |
| 4,848,920 | A * | 7/1989 | Heathe et al. | 366/339 |
| 4,907,725 | A * | 3/1990 | Durham | 222/129.1 |
| 4,922,114 | A * | 5/1990 | Boehme | 250/436 |
| 4,929,088 | A | 5/1990 | Smith | |
| 5,047,634 | A * | 9/1991 | Guelin et al. | 250/255 |
| 5,056,586 | A * | 10/1991 | Bemisderfer | 165/109.1 |
| 5,063,000 | A * | 11/1991 | Mix | 261/94 |
| 5,181,561 | A * | 1/1993 | Ayers et al. | 165/162 |
| 5,230,656 | A * | 7/1993 | Paterson et al. | 454/263 |
| 5,255,737 | A * | 10/1993 | Gentry et al. | 165/159 |
| 5,312,694 | A * | 5/1994 | Sugawara | 428/592 |
| 5,322,569 | A * | 6/1994 | Titus et al. | 134/1 |
| 5,528,044 | A * | 6/1996 | Hutchison | 250/431 |
| 5,540,848 | A * | 7/1996 | Engelhard | 210/748.11 |
| 5,675,153 | A * | 10/1997 | Snowball | 250/438 |
| 5,696,380 | A | 12/1997 | Cooke et al. | |
| 5,785,845 | A * | 7/1998 | Colaiano | 210/167.3 |
| 5,800,059 | A | 9/1998 | Cooke et al. | |
| 5,866,910 | A | 2/1999 | Cooke et al. | |
| 5,915,472 | A * | 6/1999 | Takikawa et al. | 165/158 |
| 5,994,705 | A | 11/1999 | Cooke et al. | |
| 6,000,841 | A | 12/1999 | Cooke et al. | |
| 6,015,229 | A | 1/2000 | Cormack et al. | |
| 6,224,759 | B1 * | 5/2001 | Whitby et al. | 210/198.1 |
| 6,375,128 | B1 * | 4/2002 | Condon et al. | 248/57 |
| 6,420,715 | B1 | 7/2002 | Cormack et al. | |
| 6,454,952 | B1 | 9/2002 | Thorpe | |
| 6,464,936 | B1 * | 10/2002 | Mowat et al. | 422/22 |
| 6,657,205 | B1 * | 12/2003 | Wong | 250/438 |
| 6,672,260 | B1 * | 1/2004 | Sun | 122/510 |
| 6,796,335 | B1 * | 9/2004 | Hubbard et al. | 138/106 |
| 6,874,769 | B2 * | 4/2005 | Lantz et al. | 261/95 |
| 7,143,838 | B2 * | 12/2006 | Piccat | 172/604 |
| 7,166,850 | B2 * | 1/2007 | Brunet et al. | 250/436 |
| 7,497,270 | B2 * | 3/2009 | Bruce | 172/604 |
| 7,510,172 | B2 * | 3/2009 | Kojima | 261/79.2 |
| 7,540,955 | B2 * | 6/2009 | Hatch et al. | 210/198.1 |
| 7,874,376 | B2 * | 1/2011 | Piccat | 172/604 |
| 7,992,651 | B2 * | 8/2011 | Bruce | 172/604 |
| 2002/0038620 | A1 * | 4/2002 | Gentilhomme | 111/166 |
| 2007/0243798 | A1 * | 10/2007 | Annen et al. | 451/28 |
| 2009/0108222 | A1 | 4/2009 | Spiers et al. | |
| 2009/0206006 | A1 | 8/2009 | Allam | |
| 2010/0326894 | A1 * | 12/2010 | Palmgren et al. | 209/659 |
| 2011/0162856 | A1 * | 7/2011 | Bruce | 172/604 |
| 2012/0102902 | A1 * | 5/2012 | Gallagher et al. | 55/484 |

FOREIGN PATENT DOCUMENTS

| | | |
|---|---|---|
| EP | 0 299 433 | 1/1989 |
| EP | 0299433 A1 | 1/1989 |
| EP | 1 780 176 | 5/2007 |
| JP | 62106834 A | 5/1987 |
| WO | 0024556 | 3/2000 |
| WO | 0024556 A1 | 5/2000 |

OTHER PUBLICATIONS

European Patent Office, EP Office Action received in corresponding EP Application Serial No. 08732910.8-2307 issued Jul. 12, 2010, 4 pages.

Official Action issued in European Patent Application No. 08732910.8, dated Feb. 1, 2011, 5 pages.

European Search Report issued in European Patent Application No. 12177545.6, dated Sep. 24, 2012, 7 pages.

\* cited by examiner

MULTIPLE HELICAL VORTEX BAFFLE

FIELD OF THE INVENTION

The present invention generally relates to turbulent fluid flow, and more particularly to a baffle for generating multiple helical vortices in a fluid stream beneficial in a wide variety of industrial applications.

BACKGROUND OF THE INVENTION

The creation of turbulence within a fluid stream has many industrial applications. For example, the creation of turbulence generally enhances the mixing of two fluid streams. The mixing of fluids has applicability to a wide range of industrial processes including for example burner designs that rely on the mixing of a fuel with air. In such burner designs, as well as many other industrial processes that rely on the mixing of two fluid streams, the mixing of the fluid streams may be achieved or enhanced by channeling the streams through a static mixer. A static mixer typically includes one or more baffle plates or other similar elements that create or generate turbulent flow zones within the static mixer that facilitate mixing of the fluid streams.

The creation of turbulence within a flow stream may also be desirable in applications where contact or near contact between a fluid and a surface results in some benefit. By way of example, heat exchangers generally rely on the contact or near contact between a fluid stream and a surface to effectuate heat transfer to or from the surface via the fluid stream. One such heat exchanger is a shell-and-tube heat exchanger wherein one fluid stream flows through one or more inner tubes and another fluid stream flows through an outer tube or shell containing the inner tubes. Heat transfer between the two fluid streams is across the wall on the inner tube(s) and thus contact or near contact between the fluid streams and the wall of the inner tube(s) enhances heat transfer therebetween. In this regard, shell-and-tube heat exchanges may include one or more baffle plates or other similar elements (typically on the shell side of the heat exchanger, for example) that create or generate turbulent flow zones within the heat exchanger that enhance heat transfer between the fluid streams.

One particular industrial application where creating turbulence so as to bring a fluid stream in contact with or adjacent to a surface occurs in the water treatment industry. In this industry, for example, ultraviolet light reactors are used to treat contaminated water. Typically, ultraviolet light reactors include an inner tube and an outer tube concentrically disposed about the inner tube. A UV light source is typically disposed within the inner tube and the inner tube is formed from a suitable material that allows UV light to pass therethrough. Contaminated water flows through the passage between the inner and outer tubes and is exposed to the UV light to effect treatment of the water.

One or more baffle plates may be located along the axis of the reactor. In conventional designs, the baffle plates are configured as generally flat or planar disc plates having an outer periphery and an aperture formed therethrough that defines an inner periphery (e.g., a washer). The planar disc plates are positioned so that the outer periphery engages the inner surface of the outer tube and the inner tube is disposed through the aperture such that the outer surface of the inner tube is adjacent, but spaced from the inner periphery in the plate to form a gap therebetween. In this way, as the contaminated water flows along the passage between the inner and outer tubes it has to pass through the gap between the inner tube and inner periphery of the baffle plate(s). The reduction in cross-sectional area as the water flows through the gap results in an increase in the local fluid velocity of the water. When this relatively fast moving fluid contacts the relatively slow moving fluid behind or downstream of the baffle plate, the shear created by the differential velocity forms toroidal vortices (e.g., similar to smoke rings) that move in the downstream direction.

While generally successful for certain water treatment applications, there are a number of drawbacks to conventional ultraviolet light reactors that limit their use in a broader range of water treatment applications. For example, the ultraviolet light reactors are generally effective for high UV transmittance fluids but lose their effectiveness as the ability of the UV light to penetrate the water diminishes. Accordingly, ultraviolet light reactors are most effective for water with low solids content. For water with relatively high solids content, the UV light will penetrate into the fluid only a short distance (as little as 0.1 mm in some applications). Thus, some of the water borne particles may have little or no exposure to the UV light. For effective treatment in these high solids content applications then, it is necessary to bring the water borne particles near the inner tube from where the UV light emanates.

Planar disc plates as described above and the toroidal vortices they generate provide relatively low improvement to the treatment of high solids content contaminated water. In this regard, it is believed that toroidal vortices are relatively unstable and do not permit different water borne particles to enter and leave the toroidal vortex as it moves downstream. As a result, relatively few water borne particles are brought into proximity to the inner tube, even though turbulent vortex generation occurs. Moreover, because relatively few water borne particles are brought into proximity to the inner tube, effective treatment of high solids content water via UV treatment may not be achieved.

In addition to the above, planar disc plates are often currently utilized in ultraviolet light reactors to direct at least a component of the fluid flow transversely across the inner tube. Such transverse flow results in a lateral loading force and associated bending moments on the inner tube. In current designs, the inner tubes are typically formed from rather brittle quartz tubes that are susceptible to fracture induced by the bending moments. As a result, attempts to increase the turbulence and vortex shedding to improve water treatment by increasing the flow rate through the reactor is limited by the allowable bending stress limitations of the inner tube.

Accordingly, there is a need for an improved baffle design and apparatus utilizing such baffles that address these and other drawbacks of existing devices.

SUMMARY OF THE INVENTION

In one embodiment, a baffle that addresses the shortcomings of existing baffles includes a body member having a first surface, a second opposed surface, and an outer peripheral edge. An aperture is formed through the body member so as to define an inner peripheral edge. The inner peripheral edge is distorted so as to be non-planar. For example, the inner peripheral edge may include a plurality of undulations having a plurality of peaks and valleys. In one exemplary embodiment, the inner peripheral edge is sinusoidal.

In an alternate baffle design, the baffle includes a body member having a first surface, a second opposed surface, and an outer peripheral edge. The outer peripheral edge is distorted so as to be non-planar. For example, the outer peripheral edge may include a plurality of undulations having a plurality of peaks and valley. In one exemplary embodiment, the outer peripheral edge is sinusoidal.

The baffles in accordance with embodiments of the invention may be incorporated into various apparatus so as to provide certain benefits or advantages. In one embodiment, an apparatus includes a first conduit having a first end, a second end, and a first channel extending therebetween. At least one baffle is disposed in the first channel and includes a body member having a first surface, a second opposed surface, and an outer peripheral edge. At least one aperture is formed through the body member to define an inner peripheral edge. The inner peripheral edge is distorted so as to be non-planar. For example, the inner peripheral edge may include a plurality of undulations having a plurality of peaks and valleys. In one exemplary embodiment, the inner peripheral edge is sinusoidal.

A second conduit may be disposed in the first conduit and includes a first end, a second end, and a second channel extending therebetween. The second conduit extends through the aperture in the baffle so as to define a gap between the second conduit and the inner peripheral edge of the baffle. In addition, at least one baffle may be disposed in the second channel and includes a body member having a first surface, a second opposed surface, and an outer peripheral edge. The outer peripheral edge is distorted so as to be non-planar. For example, the outer peripheral edge may include a plurality of undulations having a plurality of peaks and valley. In one exemplary embodiment, the outer peripheral edge is sinusoidal.

In one exemplary embodiment, an ultraviolet light reactor for treating a contaminated fluid includes a first fluid conduit having a first end, a second end, and a first fluid channel extending therebetween, and a second conduit disposed in the first conduit and having a first end, a second end, and a second fluid channel extending therebetween. An ultraviolet light source is disposed in the second channel and emanates ultraviolet light that passes through the second conduit to expose the contaminated fluid flowing through the first fluid channel to ultraviolet light. To enhance the treatment process, at least one baffle is disposed in the first fluid channel and includes a body member having a first surface, a second opposed surface, and an outer peripheral edge. An aperture is formed through the body member so as to define an inner peripheral edge. The inner peripheral edge is distorted so as to be non-planar.

In another exemplary embodiment, a heat exchanger includes a first fluid conduit having a first end, a second end, and a first fluid channel extending therebetween, and a second fluid conduit having a first end, a second end, and a second fluid channel extending therebetween. At least one baffle is disposed in the first fluid channel and includes a body member having a first surface, a second opposed surface, and an outer peripheral edge. At least one aperture is formed through the body member to define an inner peripheral edge and receives the second fluid conduit therethrough so as to define a gap between the second conduit and the inner peripheral edge of the baffle. The inner peripheral edge is distorted so as to be non-planar.

In still another exemplary embodiment, a static mixer for mixing a first fluid with a second fluid includes a fluid conduit having a first end, a second end, and a fluid channel extending therebetween. At least one baffle is disposed in the fluid channel and includes a body member having a first surface, a second opposed surface, and an outer peripheral edge. At least one aperture is formed through the body member to define an inner peripheral edge. The inner peripheral edge is distorted so as to be non-planar.

These and other objects, advantages and features of the invention will become more readily apparent to those of ordinary skill in the art upon review of the following detailed description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
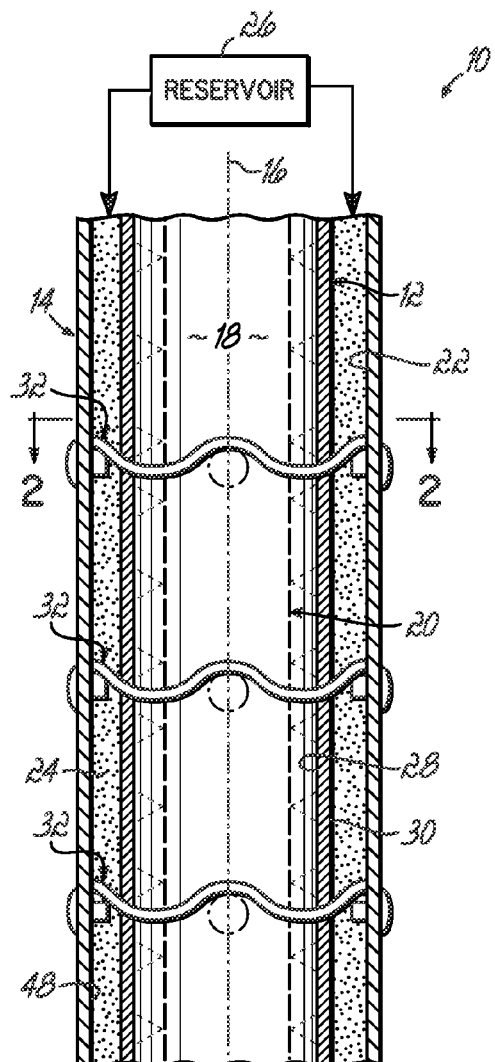
FIG. 1 is a partial cross-sectional view (baffles shown in elevation view) of an ultraviolet light reactor in accordance with an embodiment of the invention.

Referring now to the drawings, and to FIG. 1 in particular, an ultraviolet light reactor incorporating a baffle in accordance with an embodiment of the invention is shown for treating contaminated water that overcomes many of the drawbacks of existing reactors. The ultraviolet light reactor 10 includes an inner tube 12 and an outer tube 14 concentrically disposed about the inner tube 12 and generally extending along a longitudinal axis 16. The inner tube 12 defines a space 18 wherein at least one ultraviolet (UV) light source, illustrated schematically at 20, is disposed. As recognized by those of ordinary skill in the art, such UV light sources are readily commercially available. A fluid channel 22 is defined between the inner and outer tubes 12, 14 and receives contaminated water 24 therethrough, such as from a reservoir 26 in fluid communication with the fluid channel 22. The inner tube 12 is formed from a suitable material that allows ultraviolet light, generated by light source 20, to pass through the wall of tube 12 from an inner surface 28 to an outer surface 30 and into the fluid channel 22 so as to treat the contaminated water 24 flowing therethrough. For example, the inner tube 12 may be formed from quartz or other suitable materials.

To overcome many of the drawbacks of conventional ultraviolet light reactors as detailed above, especially for high solids content contaminated water, the number of water borne particles brought into proximity to the outer surface 30 of inner tube 12 should be increased relative to existing reactors. To this end, the ultraviolet light reactor 10 includes at least one, and preferably a plurality of baffles 32 disposed in the fluid channel 22 in spaced-apart relation along longitudinal axis 16. As described in greater detail below, each of the baffles 32 generate a plurality of helical vortices that increase the number of water borne particles that are brought into proximity to the outer surface 30 of the inner tube 12.

Figure 2:
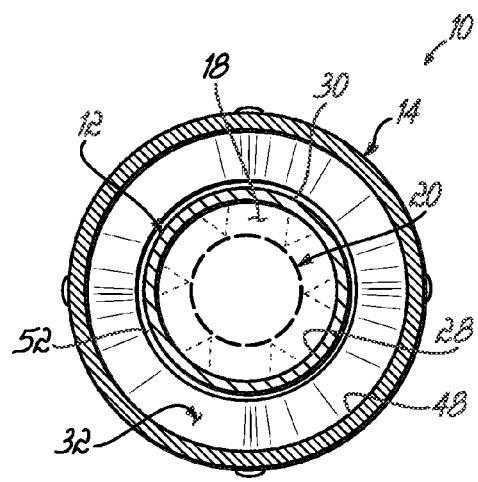
FIG. 2 is another cross-sectional view of the ultraviolet light reactor shown in FIG. 1 taken along the line 2-2.
Figure 3:
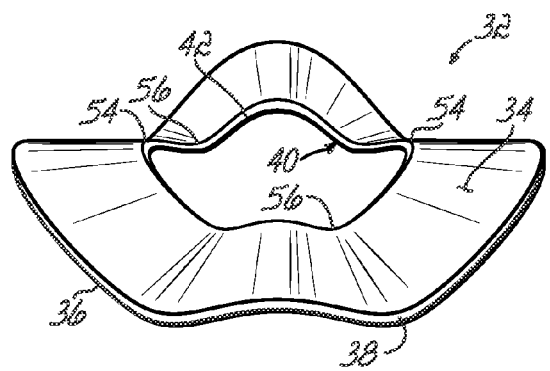
FIG. 3 is a perspective view of a baffle in accordance with an embodiment of the invention.

Each of the baffles 32 is substantially the same and a description of one such baffle 32 will suffice for a description of the remaining baffles. As shown in FIG. 3, in one embodiment a baffle 32 includes a first surface 34, a second opposed surface 36, and an outer peripheral edge 38. Moreover, the baffle 32 includes a central aperture 40 extending between the first and second surfaces 34, 36 that defines an inner peripheral edge 42. As best shown in FIG. 2, the baffle 32 has an outer cross-dimension sized relative to an inner cross-dimension of the outer tube 14 and is closely received therein to effectively prevent water from flowing around the outer peripheral edge 38 of the baffle 32. The outer peripheral edge 38 may also be sealed to the inner surface 48 of the outer tube 14 using sealants or gaskets as generally known in the art. In addition, the central aperture 40 in the baffle 32 has a cross-dimension that is greater than an outer cross-dimension of the inner tube 12. Thus, the inner tube 12 may extend through the central aperture 40 such that the inner peripheral edge 42 of the baffle 32 is spaced from the outer surface 30 of the inner tube 12 to define a gap 52 therebetween. In this configuration, for the contaminated water 24 to flow past the baffle 32, the water must flow through the gap 52 between the inner tube 12 and the inner peripheral edge 42. As shown in FIG. 1, the baffles 32 may be supported in outer tube 14 by a plurality of rivets. Those of ordinary skill in the art will recognize other types of fasteners suitable for supporting the baffles 32 in outer tube 14. Moreover, while the plurality of baffles 32 are shown as separate elements, the plurality of baffles 32 may be coupled by one or more legs or posts so as to spatially fix each baffle relative to the other baffles. Such a configuration allows the plurality of baffles 32 to be disposed in outer tube 14 as a unitary structure.

As illustrated in FIG. 2, the cross-sectional area of the fluid flow path through the gap 52 is reduced, and may be significantly reduced, as compared to the cross-sectional area of the fluid channel 22. As recognized by those of ordinary skill in the art, such a reduction in cross-sectional area results in a local increase in the fluid velocity of the contaminated water 24 as it passes through the gap 52. As shown in FIG. 1, however, the cross-sectional area of the fluid flow path immediately downstream of the baffle 32 quickly expands back to that of fluid channel 22, causing the local fluid velocity of the water 24 to decrease. As explained above, the shear created by this difference in fluid velocities causes vortices to form downstream of the baffle 32. As explained below, however, the configuration of the vortices produced by baffle 32 is significantly different than the toroidal vortices produced by planar disc baffle plates in current designs.

Figure 4A:
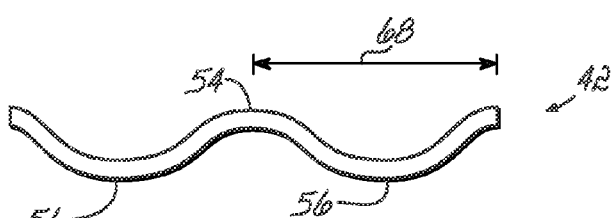
FIG. 4A is a schematic illustration of an inner peripheral edge configuration in accordance with an embodiment of the invention.
Figure 4B:
FIG. 4B is a schematic illustration of another inner peripheral edge configuration in accordance with another embodiment of the invention.

To this end and in an advantageous aspect of the invention, at least the inner peripheral edge 42 of baffle 32 has a non-planar configuration, i.e., the points that define the inner peripheral edge 42 do not lie in a single plane. Instead, and as best shown in FIG. 3, the inner peripheral edge 42 has a plurality of undulations that generally define a plurality of crests 54 and troughs 56 along the inner peripheral edge 42 when viewed in a direction generally perpendicular to a center axis of the baffle 32 and which extend radially outward from proximate the center axis to the outer peripheral edge 38. For example, as schematically illustrated in FIG. 4A, in one embodiment the inner peripheral edge 42 may be generally sinusoidal with smooth transitions between the crests and troughs. The invention is not so limited, however, as the inner peripheral edge 42 may have other configurations that generally define peaks and valleys. For example, in another embodiment the inner peripheral edge 42a may have relatively sharp transitions between the peaks and valleys, as schematically illustrated in FIG. 4B. Those of ordinary skill in the art will recognize a wide variety of inner peripheral edge configurations that generally define peaks and valleys within the scope of the invention. Those shown in FIGS. 4A and 4B are exemplary and therefore do not limit the invention to these particular configurations.

The number of crests and troughs 54, 56 along inner peripheral edge 42 may vary depending on the particular application. For example, in one exemplary embodiment the inner peripheral edge 42 may include four sinusoids resulting in four such crests and troughs 54, 56. Other applications may have more or less as dictated by the requirements or desires in those applications. Thus, the invention is not limited to a specific number of crests or troughs 54, 56. Moreover, the amplitude of the crests and troughs 54, 56 may also vary depending on the particular application. Furthermore, the distortion of the inner peripheral edge 42 to form the crests and troughs 54, 56 may extend outwardly along baffle 32 toward outer peripheral edge 38. For example, in one embodiment, the distortion of the inner peripheral edge 42 extends to the outer peripheral edge 38 so that the outer peripheral edge 38 also defines a plurality of crests and troughs (FIG. 3). Alternatively, the distortion of the inner peripheral edge 42 may extend only partially toward the outer peripheral edge 38 so that an outer portion of the baffle 32 remains generally planar (not shown).

By configuring the inner peripheral edge 42 with a plurality of undulations provides improved mixing of the contaminated water 24 in the fluid channel 22 that brings an increased number of water borne particles in proximity to the outer surface 30 of the inner tube 12. In particular, the undulations in the inner peripheral edge 42 form pairs of counter-rotating helical vortices having rotational axes generally parallel to the longitudinal axis 16 of the reactor 10 as will now be explained.

Figure 5A:
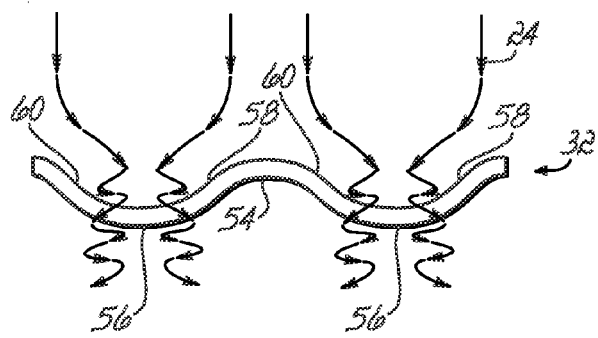
FIG. 5A is a schematic illustration of a fluid interacting with the baffle to generate helical vortices in accordance with the invention.
Figure 5B:
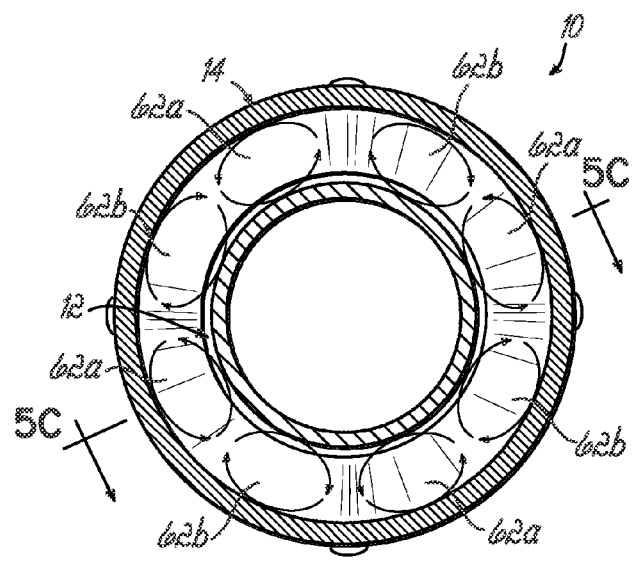
FIG. 5B is a cross-sectional view of the reactor of FIG. 1 downstream of the baffle and illustrating the helical vortices.
Figure 5C:
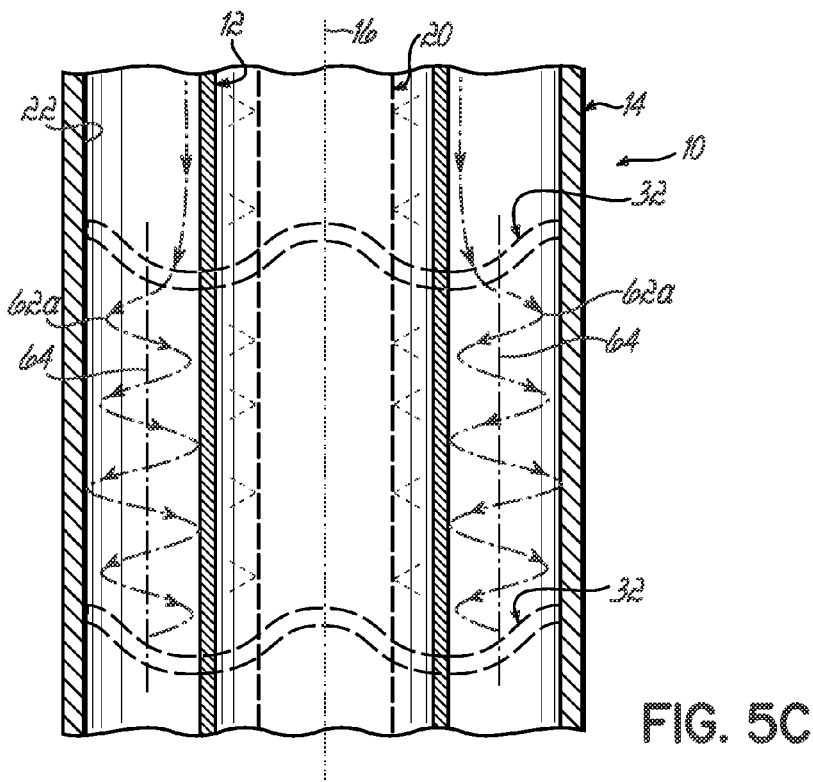
FIG. 5C is another cross-sectional view of the reactor of FIG. 1 downstream of the baffle and illustrating the helical vortices.

As shown schematically in FIG. 5A, as the water 24 moves toward the baffle 32, the water contacts the crests 54 of the baffle 32 and is redirected to flow along the converging surfaces 58, 60 and toward the troughs 56. As illustrated in FIG. 5B, this redirection of the flow toward the troughs 56 results in a pair of counter-rotating vortices 62a, 62b downstream of the baffle 32 for each of the troughs 56. Moreover, as a result of the undulations in the inner peripheral edge 42 and as illustrated in FIG. 5C, each of the vortices 62a, 62b also has a helical configuration that define an axis 64 that is generally parallel to the longitudinal axis 16. It is believed that the helical vortices 62a, 62b generated by baffle 32 are stable and allow water borne particles to continually enter and leave the vortices 62a, 62b. As a result, an increased number of water borne particles get swept up in the vortices 62a, 62b so as to be brought into proximity to the outer surface 30 of the inner tube 12. Consequently, more water borne particles are exposed to the UV light emanating from the light source 20 and through the wall of the inner tube 12. This results in improved treatment of contaminated water. More particularly, for high solids content contaminated water, wherein penetration of the UV light through the fluid channel 22 may be limited, the efficacy of UV treatment may be significantly improved.

Some of the aspects of the vortices 62a, 62b may be manipulated depending on the specific application. For example, the cross-dimension of the vortices 62a, 62b may be varied by varying the pitch (wavelength) 68 of the undulations along the inner peripheral edge 42 (i.e., the distance between adjacent crests 54 or peaks in the configuration of the inner peripheral edge 42). The rotational velocity of the vortices 62a, 62b may also be varied by varying the pitch 68. Additionally, the rotational velocity of the vortices 62a, 62b may also be varied by varying the peak fluid velocity as the water moves through the gap 52. This may be done, for example, by varying the bulk flow rate of the water moving through the reactor 10. Alternatively, the peak fluid velocity may be varied by varying the cross-sectional area of the fluid flow path through the baffle 32. For example, decreasing the width of the gap 52 will generally increase the peak fluid velocity through the baffle 32, and increasing the width of the gap 52 will generally decrease the peak fluid velocity through the baffle 32. The pitch, peak velocity, and other aspects may be manipulated to achieve the desired characteristics for vortices 62a, 62b.

In addition to that noted above concerning the increased number of water borne particles baffle 32 brings in proximity to the outer surface 30 of the inner tube 12, baffle 32 provides additional benefits relative to existing reactor designs. By way of example, baffle 32 results in substantially no lateral loading and the associated bending stresses on the inner tube 12. This in turn allows the fluid velocity to be increased without a limitation imposed by the fracture limits of the inner tube 12. Thus, the reactor 10 incorporating baffle(s) 32 may operate at higher fluid velocities as compared to current reactors. At higher fluid velocities, the reactor 10 is capable of treating a greater volume of contaminated water relative to current reactors in a given period of time. Moreover, due to the higher operating velocities, the number of water borne particles that flow near or adjacent the inner tube 12 so as to expose or re-expose the particles to the UV light emanating therefrom is even further increased. Thus, the efficacy of the UV treatment may be improved.

For clarity of disclosure and discussion, aspects of the invention have been discussed herein primarily in the context of an ultraviolet light reactor for water treatment applications. It will be understood and appreciated that the baffle 32 and the resulting vortex generation associated therewith are applicable to a wide variety of industrial processes and are not limited to the water treatment application described above. Additional applications of the baffle will now be described.

Figure 6:
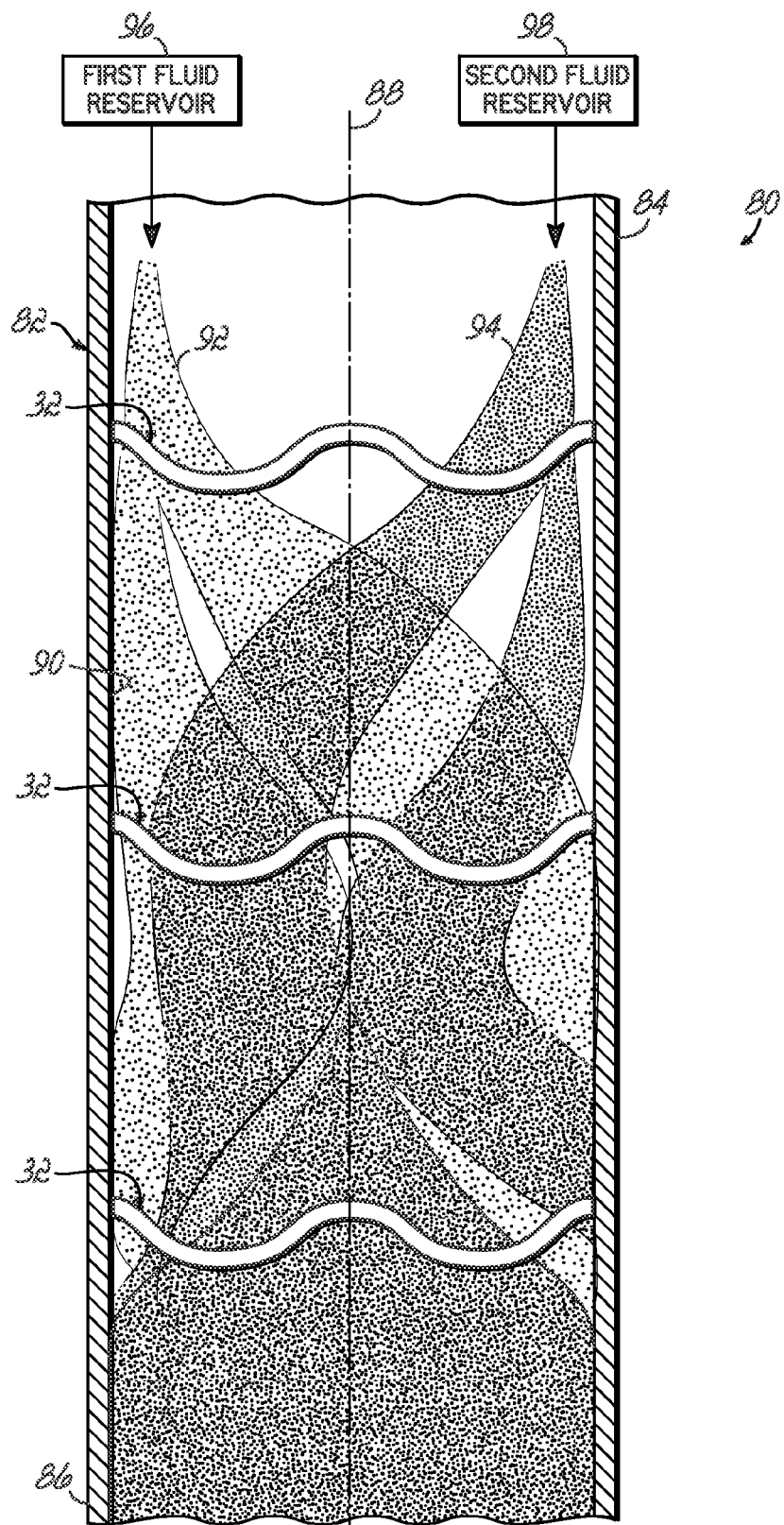
FIG. 6 is a partial cross-sectional view similar to FIG. 1 of a static mixer in accordance with an embodiment of the invention.

For example, in another embodiment, the baffle 32 may be used in a static mixer to mix two fluid streams. As shown in FIG. 6, in which like reference numerals refer to like features in FIGS. 1-5C, the static mixer 80 includes a tube 82 having a first end 84, a second end 86, and one or more baffles 32 in spaced-apart relation along a longitudinal axis 88 of the tube 82. The tube 82 defines a flow channel 90 that receives at least two fluid streams 92, 94 from, for example, fluid reservoirs 96, 98, respectively, in fluid communication with the first end 84. The fluid streams 92, 94 may be completely separated or only partially mixed upon entering the static mixer 80.

The outer cross-dimension of the baffle 32 is sized relative to an inner cross-dimension of the tube 82 and closely received therein to effectively prevent fluid from flowing around the outer peripheral edge 38 of the baffle 32. In this embodiment, an inner tube may be omitted such that the two fluid streams 92, 94 pass through the central aperture 40 in baffle 32. As described in detail above, the undulating configuration of at least the inner peripheral edge 42 of the baffle 32 generates counter-rotating helical vortices similar to vortices 62a, 62b shown in FIGS. 5B and 5C that enhance the mixing of the fluid streams 92, 94. In this way, when the fluid streams 92, 94 reach the second end 86 of the tube 82, the fluid streams 92, 94 are substantially uniformly mixed.

In one exemplary application, the static mixer 80 may be used in industrial processes utilizing gas or liquid burners. In these applications, effective mixing of a fuel stream with an air stream is important for efficient operation of the burner. The static mixer 80, however, is not limited to such an application as the mixer may be beneficial in virtually any situation where two or more fluid streams are to be mixed together for industrial or commercial purposes.

In another alternate embodiment of a static mixer (not shown), an inner tube may extend through the central apertures in the baffles 32, much like that shown in FIG. 1. In this embodiment, the first fluid stream 92 may flow through the inner tube and the second fluid stream may flow through the outer tube 82. Holes may be formed in the inner tube just downstream of each of the baffles 32 that essentially inject the first fluid stream 92 into the second fluid stream 94. Locating the holes in the inner tube just downstream of the baffles 32 provides mixing of streams 92, 94 in a high velocity, high shear and low pressure zone that enhances mixing.

Figure 7:
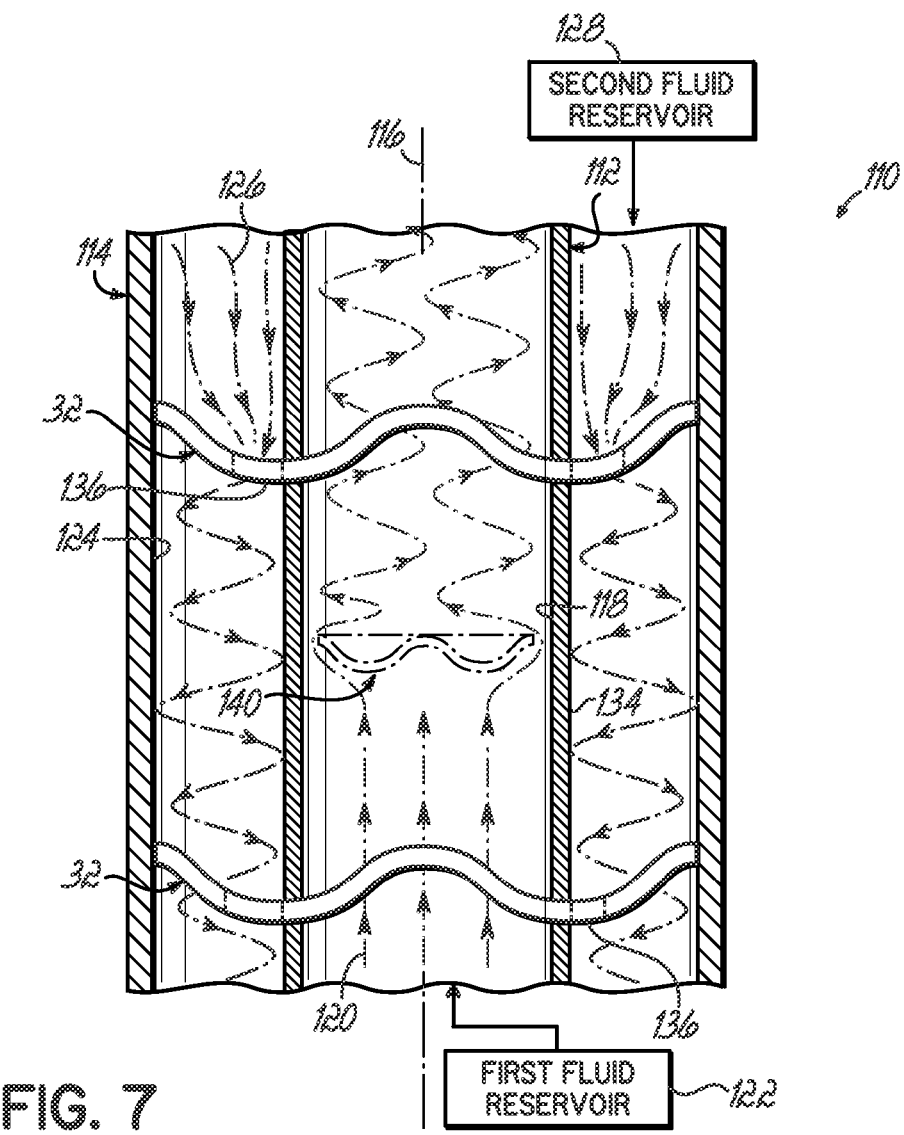
FIG. 7 is a partial cross-sectional view similar to FIG. 1 of a heat exchanger in accordance with an embodiment of the invention.

Another application that may gain the benefit of the baffle 32 is in heat exchangers, and more particularly, shell-and-tube heat exchanges which are used in a wide range of industrial applications. As shown in FIG. 7, in which like reference numerals refer to like features in FIGS. 1-5C, a shell-and-tube heat exchanger 110 includes at least one inner tube 112 (single pass exchanger shown) and an outer tube or shell 114 enclosing the inner tube 112 and extending along a longitudinal axis 116. The inner tube 112 defines a first fluid channel 118 that receives a first fluid stream 120 therethrough, such as from a reservoir 122 in fluid communication with the first fluid channel 118. The outer tube 114 defines a second fluid channel 124 that receives a second fluid stream 126 therethrough, such as from a reservoir 128. As recognized by those of ordinary skill in the art, the fluid streams 120, 126 may flow in the same direction or in opposite directions. Additionally, the first fluid stream 120 may have a temperature higher than that of the second fluid stream 126, or vice versa. In any event, to enhance heat transfer between the two streams 120, 126, one or more baffles 32 may be disposed within the second fluid channel 124, as shown in FIG. 7.

Similar to that shown in FIG. 1, the outer cross-dimension of the baffle 32 is sized relative to an inner cross-dimension of the outer tube 114 and closely received therein to effectively prevent fluid from flowing around the outer peripheral edge 38 of the baffle 32. In addition, the central aperture 40 in the baffle has a cross-dimension that is greater than an outer cross-dimension of the inner tube 112. The inner tube 112 extends through the central aperture 40 such that the inner peripheral edge 42 is spaced from the outer surface 134 of the inner tube 112 to define a gap 136 therebetween. In a manner similar to that described above, the undulating configuration of at least the inner peripheral edge 42 of the baffle 32 generates counter-rotating helical vortices similar to vortices 62a, 62b shown in FIGS. 5B and 5C in the second fluid channel 124 that enhances the heat transfer between the second fluid stream 126 and the inner tube 112, and thus between the two fluid streams 120, 126.

Figure 8:
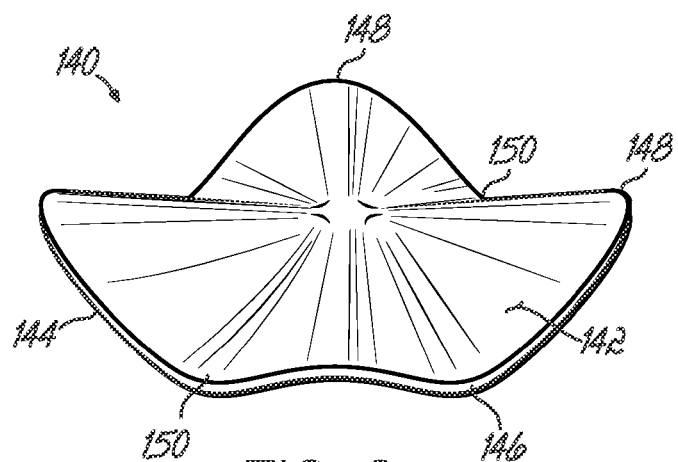
FIG. 8 is a perspective view of a baffle in accordance with another embodiment of the invention.

The embodiments described thus far utilize a baffle with the undulations formed on the inner peripheral edge of the baffle. The invention, however, is not limited to such a configuration. In another embodiment, and as illustrated in FIG. 8, a baffle 140 may include a first surface 142, a second opposed surface 144, and an outer peripheral edge 146. At least the outer peripheral edge 146 has a non-planar configuration, such as by including a plurality of undulations that generally define a plurality of crests and troughs 148, 150, respectively, when viewed in a direction generally perpendicular to a center axis of the baffle 140 and which extend radially outward from proximate the center axis to the outer peripheral edge 146. In this embodiment, the baffle 140 may not have a central aperture. In an alternate embodiment, however, a central aperture may be formed through the baffle 140, which may have no undulations or have undulations as shown in FIG. 3.

Figure 9:
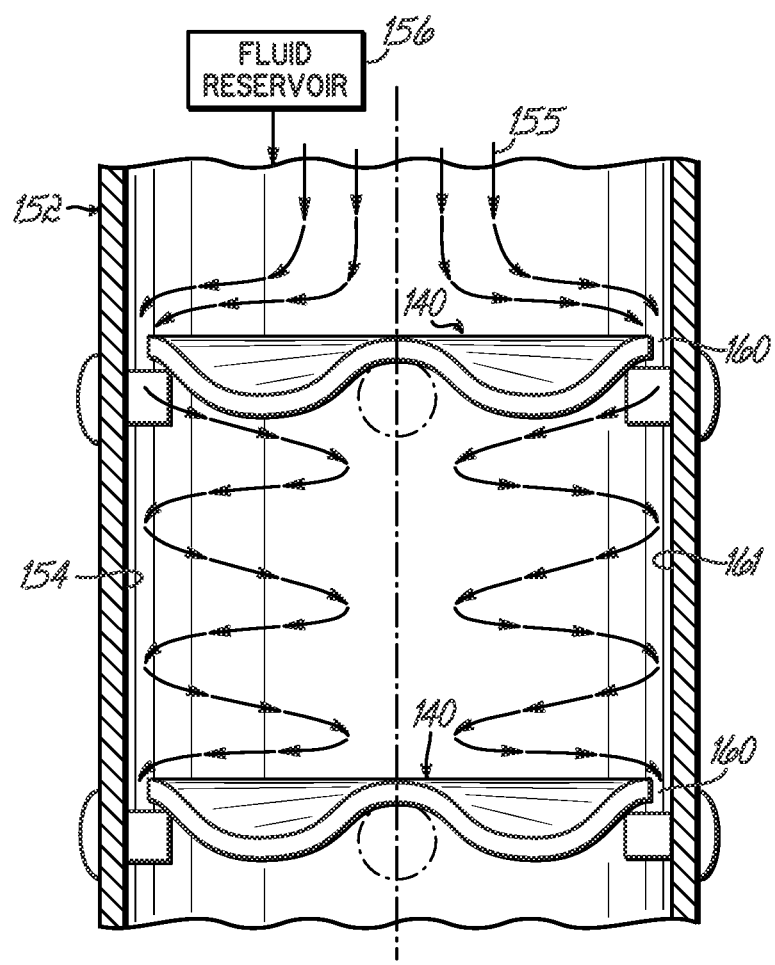
FIG. 9 is a partial cross-sectional view of an apparatus in accordance with an embodiment of the invention.

FIG. 9 illustrates the use of baffle 140 within a tube 152 that defines a fluid channel 154 that receives a fluid stream 155 from, for example, a fluid reservoir 156 in fluid communication with fluid channel 154. In this embodiment, the outer cross-dimension of the baffle 140 is less than the inner cross-dimension of the tube 152 to define a gap 160 therebetween. Similar to that described above in FIGS. 5A-5C, as the fluid flows through the gap 160, the undulations in the outer peripheral edge 146 cause pairs of counter-rotating helical vortices similar to vortices 62a, 62b shown in FIGS. 5A and 5B to form downstream of the baffle 140. These vortices provide similar benefits and advantages as that described above. In particular, baffle 140 increases the number of fluid particles that are brought into proximity to the inner surface 161 of the tube 152.

Baffle 140 may be utilized, for example, in a static mixer similar to that shown in FIG. 6. In such an embodiment, instead of the fluid streams flowing through the central aperture (as shown in FIG. 6), the fluid streams will flow through the gap 160 between the baffle 140 and the inner surface 161 of the tube 152 to generate the helical counter-rotating vortices that result in mixing of the fluid streams. Alternatively, the baffle 140 may be utilized in shell-and-tube heat exchanges, similar to that illustrated in FIG. 7. In this regard, and as shown in phantom in FIG. 7, one or more baffles 140 may be disposed in the first fluid channel 118 defined by the inner tube 114 to bring an increased number of fluid particles in proximity to the inner surface of the inner tube 112. Thus, for heat exchanger applications, baffles may be disposed on the shell side, the tube side, or both.

Figure 10:
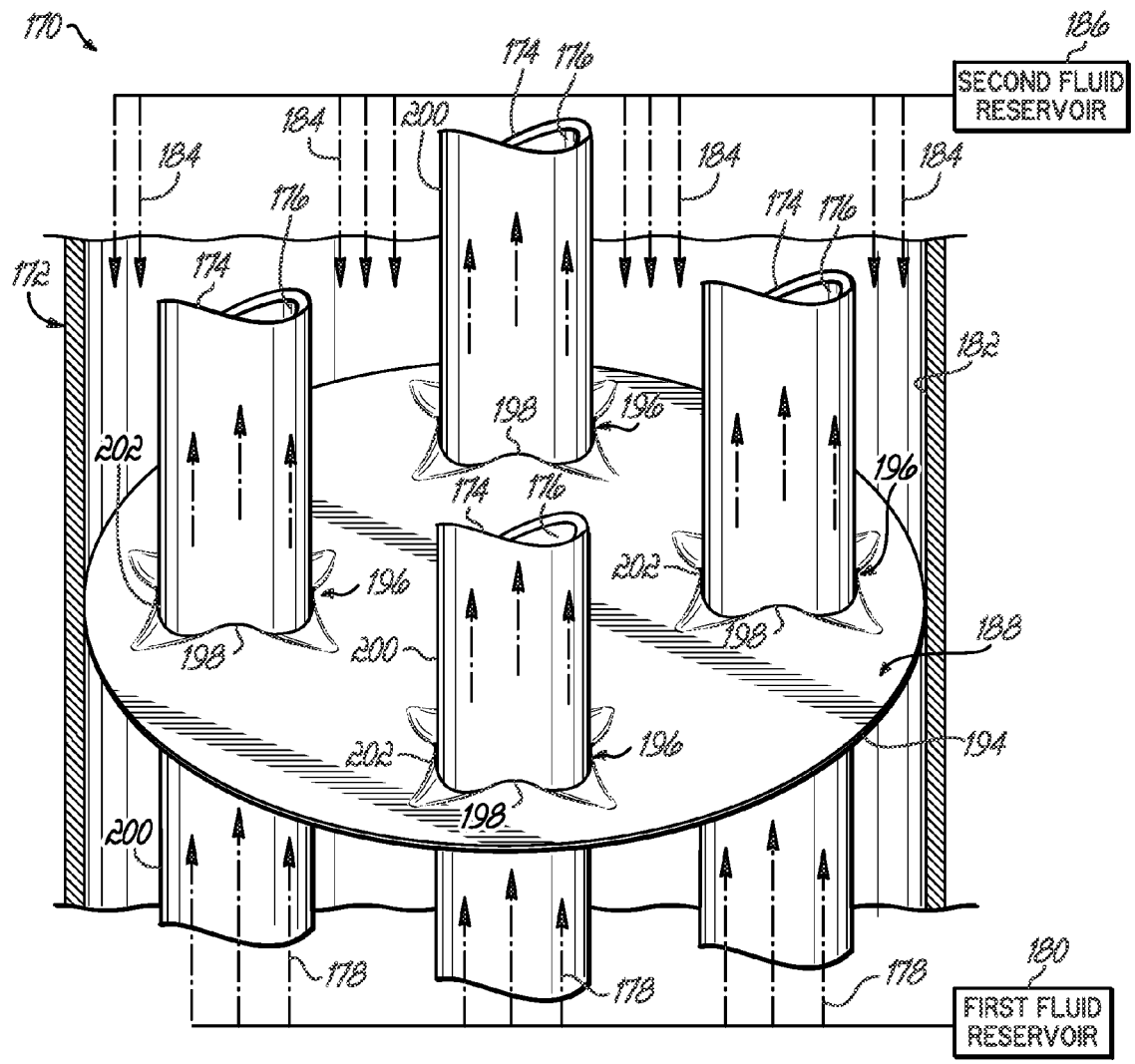
FIG. 10 is a partial cross-sectional view of a heat exchanger in accordance with another embodiment of the invention.

FIG. 10 shows another embodiment in accordance with the invention. In particular, FIG. 10 shows a shell-and-tube heat exchanger 170 having an outer tube 172 enclosing a plurality of inner tubes 174. The inner tubes 174 may be a plurality of single pass tubes or multiple passes of a single tube. The inner tubes 174 define a first fluid channel 176 that receives a first fluid stream 178 therethrough, such as from a reservoir 180 in fluid communication with the first fluid channel(s) 176. The outer tube 172 defines a second fluid channel 182 that receives a second fluid stream 184 therethough, such as from a reservoir 186. To enhance heat transfer between the two fluid streams 178, 184, one or more baffles 188 may be disposed within the second fluid channel 182.

The outer cross-dimension of the baffle 188 is sized relative to the inner cross-dimension of the outer tube 172 and closely received therein to effectively prevent fluid from flowing around the outer peripheral edge 194 of the baffle 188. In this embodiment, the baffle 188 includes a plurality of apertures 196, each receiving one of the inner tubes 174 therethrough. The apertures 196 are sized relative to the inner tubes 174 such that the inner peripheral edge 198 is spaced from the outer surface 200 of the inner tubes 174 to define a gap 202 therebetween. In a manner similar to that described above for FIG. 7, at least the inner peripheral edge 198 of each of the apertures has an undulating configuration, when viewed in a direction generally perpendicular to a longitudinal axis of the baffle 188, that generates counter-rotating helical vortices similar to vortices 62a, 62b shown in FIGS. 5A and 5B. The vortices generated at each of the apertures 196 enhance the heat transfer between the second fluid stream 184 and the corresponding inner tube 174 passing therethrough. Accordingly, the overall heat transfer between the two fluid streams 178, 184 is enhanced. Those of ordinary skill in the art will recognize that alternatively, or in addition to baffles 188, baffles similar to baffle 140 shown in FIG. 8 may be disposed in the inner tubes 174 to enhance the heat transfer between the first fluid stream 178 and the inner tube 174.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A baffle for a fluid conduit, comprising:
   a circular-shaped body member having a first surface, a second opposed surface, and a continuous outer peripheral edge that connects the first surface to the second opposed surface, the body member situated about a center axis;
   wherein the baffle is devoid of any apertures and the outer peripheral edge and at least part of the first surface and second opposed surface each are fixedly distorted to include a plurality of undulations so as to be non-planar, the undulations defining a plurality of peaks and valleys when viewed in a direction generally perpendicular to the center axis and extending radially outward from proximate the center axis to the outer peripheral edge, and
   wherein the baffle is configured to generate a plurality of counter-rotating helical vortices in a fluid stream.

2. The baffle of claim 1, wherein the outer peripheral edge is sinusoidal.

3. An apparatus, comprising:
   a first conduit having a first end, a second end, and a first channel extending between the first and second ends; and
   at least one baffle disposed in the first channel, the at least one baffle comprising:
      a generally annular-shaped body member having a first surface, a second opposed surface, and a continuous outer peripheral edge that connects the first surface to the second opposed surface; and
      a central aperture formed through the first surface and the second opposed surface of the body member to define an inner peripheral edge that connects the first surface to the second opposed surface, the aperture situated about a center axis of the body member,
   wherein the inner peripheral edge is fixedly distorted to include a plurality of undulations that define a plurality of peaks and valleys when viewed in a direction generally perpendicular to the center axis, the undulations radially extend at least partially toward the outer peripheral edge so that the first surface and second opposed surface include the peaks and valleys, and wherein the baffle is configured to generate a plurality of helical vortices in a fluid stream.

4. The apparatus of claim 3, wherein the inner peripheral edge is sinusoidal.

5. The apparatus of claim 3, further comprising:
a second conduit disposed in the first conduit and having a first end, a second end, and a second channel extending between the first and second ends,
wherein the second conduit extends through the aperture in the at least one baffle so as to define a gap between the second conduit and the inner peripheral edge of the baffle.

6. The apparatus of claim 5, further comprising:
a ultraviolet light source disposed in the second channel.

7. The apparatus of claim 5, further comprising:
at least one baffle disposed in the second channel, the at least one baffle comprising:
a body member having a first surface, a second opposed surface, and an outer peripheral edge,
wherein the outer peripheral edge is distorted so as to be non-planar.

8. The apparatus of claim 7, wherein the outer peripheral edge of the at least one baffle in the second channel is distorted to include a plurality of undulations having a plurality of peaks and valleys.

9. The apparatus of claim 8, wherein the outer peripheral edge of the at least one baffle in the second channel is sinusoidal.

10. An apparatus, comprising:
a first conduit having a first end, a second end, and a first channel extending between the first and second ends; and
at least one baffle disposed in the first channel, the at least one baffle comprising:
a circular-shaped body member having a first surface, a second opposed surface, and a continuous outer peripheral edge that connects the first surface to the second opposed surface, the body member situated about a center axis; and
wherein the baffle is devoid of any apertures and the outer peripheral edge and at least part of the first surface and second opposed surface are fixedly distorted to include a plurality of undulations so as to be non-planar, the undulations defining a plurality of peaks and valleys when viewed in a direction generally perpendicular to the center axis and extending radially outward from proximate the center axis to the outer peripheral edge,
wherein a gap is defined between the outer peripheral edge of the at least one baffle and the first channel, and
wherein the baffle is configured to generate a plurality of counter-rotating helical vortices in a fluid stream.

11. The apparatus of claim 10, wherein the outer peripheral edge is sinusoidal.

12. An ultraviolet light reactor for treating a contaminated fluid, comprising:
a first fluid conduit having a first end, a second end, and a first fluid channel extending between the first and second ends, the first fluid channel adapted to receive the contaminated fluid therethrough;
a second conduit disposed in the first fluid conduit and having a first end, a second end, and a second channel extending between the first and second ends;
an ultraviolet light source disposed in the second channel and adapted to emanate ultraviolet light that passes through the second conduit to expose contaminated fluid flowing through the first fluid channel to ultraviolet light; and
at least one baffle disposed in the first fluid channel, the at least one baffle comprising:
a generally annular-shaped body member having a first surface, a second opposed surface, and a continuous outer peripheral edge that connects the first surface to the second opposed surface; and
at least one aperture formed through the first surface and the second opposed surface of the body member to define an inner peripheral edge that connects the first surface to the second opposed surface,
wherein the body member includes a longitudinal axis and the inner peripheral edge is fixedly distorted to include a plurality of undulations that define a plurality of peaks and valleys when viewed in a direction generally perpendicular to the longitudinal axis, the undulations radially extend at least partially toward the outer peripheral edge so that the first surface and second opposed surface include the peaks and valleys, and further wherein the second conduit extends through the at least one aperture in the at least one baffle so as to define a gap between the second conduit and the inner peripheral edge of the baffle in which contaminated fluid is allowed to flow, and
wherein the baffle is configured to generate a plurality of helical vortices in a fluid stream.

13. A heat exchanger, comprising:
a first fluid conduit having a first end, a second end, and a first fluid channel extending between the first and second ends, the first fluid channel adapted to receive a first fluid therethrough;
a second fluid conduit disposed in the first fluid conduit and having a first end, a second end, and a second fluid channel extending between the first and second ends, the second fluid channel adapted to receive a second fluid therethrough having a temperature different than the first fluid; and
at least one baffle disposed in the first fluid channel, the at least one baffle comprising:
a generally annular-shaped body member having a first surface, a second opposed surface, and a continuous outer peripheral edge that connects the first surface to the second opposed surface; and
a central aperture formed through the first surface and the second opposed surface of the body member to define an inner peripheral edge that connects the first surface to the second opposed surface, wherein the second fluid conduit extends through the at least one aperture in the at least one baffle so as to define a gap between the second conduit and the inner peripheral edge of the at least one baffle, the aperture situated about a center axis of the body member,
wherein the inner peripheral edge and outer peripheral edge are fixedly distorted to include a plurality of undulations that define a plurality of peaks and valleys when viewed in a direction generally perpendicular to the center axis, the undulations extend radially outward from the inner peripheral edge to at least partially toward the outer peripheral edge so that the first surface and second opposed surface include the peaks and valleys, and
wherein the baffle is configured to generate a plurality of helical vortices in a fluid stream.

14. The heat exchanger of claim 13, further comprising:
at least one baffle disposed in the second fluid channel, the at least one baffle comprising:
a body member having a first surface, a second opposed surface, and an outer peripheral edge,
wherein the outer peripheral edge of the at least one baffle in the second fluid channel is distorted so as to be non-planar.

15. A static mixer for mixing a first fluid with a second fluid, comprising:
a fluid conduit having a first end, a second end, and a fluid channel extending between the first and second ends;
at least one baffle disposed in the fluid channel, the at least one baffle comprising:
a generally annular-shaped body member having a first surface, a second opposed surface, and a continuous outer peripheral edge that connects the first surface to the second opposed surface; and
a central aperture formed through the first surface and the second opposed surface of the body member to define an inner peripheral edge that connects the first surface to the second opposed surface, the aperture situated about a center axis of the body member,
wherein the baffle is rigid and the inner peripheral edge is fixedly distorted to include a plurality of undulations that define a plurality of peaks and valleys when viewed in a direction generally perpendicular to the center axis, the undulations radially extend at least partially toward the outer peripheral edge so that the first surface and second opposed surface include the peaks and valleys, and
wherein the baffle is configured to generate a plurality of helical vortices in a fluid stream.

16. A baffle for a fluid conduit, comprising:
a generally planar, circular-shaped body member having a first surface, a second opposed surface, and an outer peripheral edge that connects the first surface to the second opposed surface; and
a plurality of apertures formed through the first surface and the second opposed surface of the body member, each aperture defines an inner peripheral edge that connects the first surface to the second opposed surface,
wherein the body member includes a longitudinal axis and the inner peripheral edge of each aperture is fixedly distorted to include a plurality of undulations that define a plurality of peaks and valleys that are sinusoidal when viewed in a direction generally perpendicular to the longitudinal axis, the undulations extending only partially toward the outer peripheral edge so that the first surface and second opposed surface include the peaks and valleys.

17. The baffle of claim 16, wherein the peaks and valleys are spaced equidistance from one another along the inner peripheral edge.

* * * * *